(12) United States Patent
Sekine et al.

(10) Patent No.: US 12,157,328 B2
(45) Date of Patent: Dec. 3, 2024

(54) METHOD FOR PRODUCING RECORDED MATTER

(71) Applicant: Seiko Epson Corporation, Tokyo (JP)

(72) Inventors: Midori Sekine, Matsumoto (JP);
Kyohei Tanaka, Matsumoto (JP);
Kiyoshi Nakamura, Matsumoto (JP);
Haruya Koyama, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/676,272

(22) Filed: Feb. 21, 2022

(65) Prior Publication Data

US 2022/0266620 A1      Aug. 25, 2022

(30) Foreign Application Priority Data

Feb. 22, 2021   (JP) .................................. 2021-026073

(51) Int. Cl.
*B41M 7/00*      (2006.01)
*B41M 5/00*      (2006.01)
(Continued)

(52) U.S. Cl.
CPC ........ *B41M 7/0027* (2013.01); *B41M 5/0023* (2013.01); *B41M 5/0029* (2013.01);
(Continued)

(58) Field of Classification Search
CPC ............. B41M 5/0023; B41M 5/0029; B41M 5/0047; B41M 5/0064; B41M 7/0027;
(Continued)

(56) References Cited

U.S. PATENT DOCUMENTS

| 8,673,431 B2 | 3/2014 | Mochizuki et al. |
| 2003/0189626 A1* | 10/2003 | Kataoka ................. C09D 11/54 347/98 |

(Continued)

FOREIGN PATENT DOCUMENTS

| JP | 2013-067770 A | 4/2013 |
| JP | 2014-240153 A | 12/2014 |
| JP | 2017-078133 A | 4/2017 |

OTHER PUBLICATIONS

Search report for EP404816.*

(Continued)

*Primary Examiner* — Sonya M Sengupta
(74) *Attorney, Agent, or Firm* — Harness, Dickey & Pierce, P.L.C.

(57) ABSTRACT

A method for producing a recorded matter includes a first ejection step of ejecting a first ink, which is a radiation-curable ink jet composition, and adhering the first ink to a recording medium, a first irradiation step of irradiating radiation to the first ink adhered to the recording medium to obtain a cured coating film of the first ink, a second ejection step of ejecting a second ink, which is a radiation-curable ink jet composition, and adhering the second ink to the cured coating film of the first ink so that the duty is 1% or more and 20% or less, a second irradiation step of irradiating radiation to the second ink adhered to the recording medium to cure the second ink to obtain a recorded matter, and a lamination step of laminating, in the recorded matter, a recording surface to which the first ink and the second ink have been adhered, and a non-recording surface to which the first ink and the second ink have not been adhered, so that both surfaces face each other.

8 Claims, 1 Drawing Sheet

| (51) | Int. Cl. | |
|---|---|---|
| | *C09D 11/101* | (2014.01) |
| | *C09D 11/107* | (2014.01) |
| | *C09D 11/40* | (2014.01) |

(52) U.S. Cl.
 CPC ......... *B41M 7/0081* (2013.01); *C09D 11/101* (2013.01); *C09D 11/107* (2013.01); *C09D 11/40* (2013.01)

(58) Field of Classification Search
 CPC .. B41M 7/0081; C09D 11/101; C09D 11/107; C09D 11/322; C09D 11/40
 See application file for complete search history.

(56) References Cited

U.S. PATENT DOCUMENTS

| 2012/0127248 | A1* | 5/2012 | Koganehira | C09D 11/54 |
|---|---|---|---|---|
| | | | | 347/102 |
| 2014/0370214 | A1 | 12/2014 | Araki et al. | |
| 2015/0062268 | A1 | 3/2015 | Braswell | |
| 2017/0210123 | A1* | 7/2017 | Sumikawa | B41M 5/5263 |
| 2020/0131381 | A1 | 4/2020 | Koike et al. | |
| 2022/0266620 | A1* | 8/2022 | Sekine | B41M 5/0023 |

OTHER PUBLICATIONS

Search opinion for EP404816.*
English translation of CN103358742.*
English translation of CN1464841.*
Translation of CN103358742.*
Translation of CN1464841.*

* cited by examiner

METHOD FOR PRODUCING RECORDED MATTER

The present application is based on, and claims priority from JP Application Serial Number 2021-026073, filed Feb. 22, 2021, the disclosure of which is hereby incorporated by reference herein in its entirety.

BACKGROUND

1. Technical Field

The present disclosure relates to a method for producing a recorded matter.

2. Related Art

An ink jet recording method can record high-definition images by a relatively simple apparatus, and is rapidly developed in various fields. In particular, various investigations are performed on a method of recording by forming a plurality of ink layers and the like. For example, for the purpose of providing an ink set for forming a plurality of layers, which can form an image having excellent image quality and gloss, good surface state, excellent blocking resistance, and no base color tone, JP-A-2013-067770 discloses an ink set containing a coloring ink composition, which contains a predetermined radical polymerizable compound, and a clear ink composition. In the ink set, the content of the polymerization initiator contained in each of the coloring ink composition and the clear ink composition is adjusted.

As described in JP-A-2013-067770, particularly in industrial recording on a film-type recording medium, the recording medium after ink adhesion may be once wound into a roll shape and stored. JP-A-2013-067770 teaches that a clear ink layer is formed as a solid image containing the entire region where the image is formed by an image forming step. However, when the clear ink layer is formed as a solid image layer in this way, a recording surface, to which the clear ink layer or the like is adhered, is stuck to a non-recording surface at the back side during storage of the recording medium in a roll shape. In this case, when a recorded matter is unwound from the roll and used, the image may be easily separated from the recording surface or marks may remain on the attached portion, thereby damaging the recorded image.

SUMMARY

According to an aspect of the present disclosure, a method for producing a recorded matter includes a first ejection step of ejecting a first ink, which is a radiation-curable ink jet composition, and adhering the first ink to a recording medium, a first irradiation step of irradiating radiation to the first ink adhered to the recording medium to obtain a cured coating film of the first ink, a second ejection step of ejecting a second ink, which is a radiation-curable ink jet composition, and adhering the second ink to the cured coating film of the first ink so that the duty is 1% or more and 20% or less, a second irradiation step of irradiating radiation to the second ink adhered to the recording medium to cure the second ink to obtain a recorded matter, and a lamination step of laminating a recording surface, to which the first ink and the second ink have been adhered, and a non-recording surface, to which the first ink and the second ink have not been adhered, so that both surfaces face each other.

DESCRIPTION OF EXEMPLARY EMBODIMENTS

An embodiment of the present disclosure (referred to as a "present embodiment" hereinafter) is described in detail below if required with reference to the drawings, but the present disclosure is not limited to this embodiment, and various modifications can be made within a range not deviating from the gist of the disclosure. In the drawings, the same components are denoted by the same reference numeral, and duplicated description is omitted. In addition, the vertical and horizontal relationships are based on the positional relationships shown in the drawings unless otherwise specified. Further, the dimensional ratio in the drawing is not limited to the ratio shown in the drawings.

In the present specification, "(meth)acryloyl" represents at least one of acryloyl and corresponding methacryloyl, "(meth)acrylate" represents at least one of acrylate and corresponding methacrylate, and "(meth)acryl" represents at least one of acryl and corresponding methacryl.

1. Method for Producing Recorded Matter

A method for producing a recorded matter according to the present embodiment includes a first ejection step of ejecting a first ink, which is a radiation-curable ink jet composition, and adhering the first ink to a recording medium, a first irradiation step of irradiating radiation to the first ink adhered to the recording medium to obtain a cured coating film of the first ink, a second ejection step of ejecting a second ink, which is a radiation-curable ink jet composition, and adhering the second ink to the cured coating film of the first ink so that the duty is 1% or more and 20% or less, a second irradiation step of irradiating radiation to the second ink adhered to the recording medium to cure the second ink to obtain a recorded matter, and a lamination step of laminating a recording surface, to which the first ink and the second ink have been adhered, and a non-recording surface, to which the first ink and the second ink have not been adhered, so that both surfaces face each other.

In the present embodiment, the second ink laminated on the cured coating film of the first ink is adhered so that the duty is 1% or more and 20% or less, and thus irregularities can be formed on the recording surface according to the duty. Therefore, when in the recorded matter, the surface (also referred to as the "recording surface" hereinafter) to which the ink has been adhered and the surface (also referred to as the "non-recording surface" hereinafter) to which the ink has been not adhered are laminated, the contact area is decreased, and thus the close adhesion between the recording surface and the non-recording surface can be suppressed. This can improve the peelability between the recording surface and the non-recording surface and can suppress marks remaining on the recording surface and adhesion of a portion of the ink layer to the non-recording surface.

Also, when the duty of the second ink is adjusted within the range described above, there is a tendency that the influence of irregularities on image quality can be more decreased, and a change in texture of the recorded matter obtained by the first ink can be more suppressed. Each of the steps, inks used, etc. of the method for producing a recorded matter according to the present embodiment are described in detail below.

Figure 1:
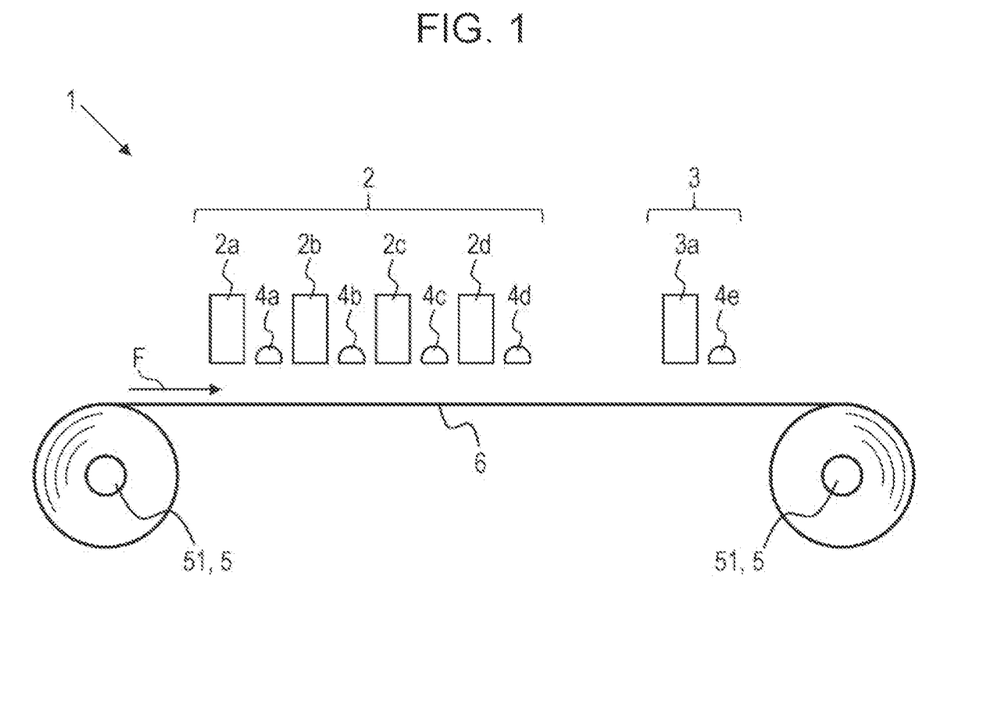
FIG. 1 is a schematic view of a recording apparatus which can be used in an embodiment of the present disclosure.

Before the description of the each of the steps, first a recording apparatus which can be used in the method for producing a recorded matter according to the present embodiment is described with reference to FIG. 1. FIG. 1 is a schematic view showing the recording apparatus which can be used in the present embodiment.

As shown in FIG. 1, a recording apparatus 1 includes a first ink jet head 2 that ejects the first ink, a second ink jet head 3 that ejects the second ink, and a transport mechanism 5 of the recording medium. As shown in the drawing, the first ink jet head 2 may have, for example, heads 2a to 2d for respective ink types. In addition, light sources 4a to 4d are provided downstream the heads 2a to 2d, respectively, in order to cure the first ink adhered to the recording medium 6.

The second ink jet head 3 is provided with, for example, a head 3a that adheres the second ink, and a light source 4e disposed downstream the head 3a in order to cure the second ink adhered to the recording medium 6.

The recording medium transport mechanism 5 has, for example, a delivery roller 51 and a winding roller 52, so that the recording medium can be delivered from the delivery roller 51 in the transport direction F and, after recording the recording medium can be wound by the winding roller 52 to form a wound body. In this case, the recording surface and the non-recording surface of the recorded matter are in contact with each other in the wound body.

1.1. First Ejection Step

The first ejection step is a step of ejecting the first ink, which is a radiation-curable ink jet composition, from the first ink jet head 2 and adhering the first ink to the recording medium 6. More specifically, the composition filled in a pressure generating chamber of the ink jet head is ejected from nozzles by driving a pressure generating unit. Such an ejection method is also referred to as an "ink jet method".

Examples of the ink jet heads 2 and 3 used in the first ejection step and the second ejection step described later, respectively, include a line head which records in a line system, and a serial head which records in a serial system.

In the line system using the line head, for example, the ink jet head having a width equal to or larger than the recording width of the recording medium is fixed to a recording apparatus. Therefore, the recording medium is moved along the sub-scanning direction (longitudinal direction, the transport direction, of the recording medium), and ink droplets are ejected from the nozzles of the ink jet head in conjugation with the movement, thereby recording an image on the recording medium.

In the serial system using the serial head, for example, the ink jet head is mounted on a carriage which can be moved along the width direction of the recording medium. The carriage is moved in the main scanning direction (lateral direction, the width direction, of the recording medium), and ink droplets are ejected from nozzle openings of the head in conjugation with the movement, whereby an image can be formed on the recording medium.

In particular, from the viewpoint of winding the recording medium with the ink adhered thereto, the line system is preferably used in the first ejection step and the second ejection step described later. In the case of the line system, recording and radiation irradiation are continuously performed by using the line head while the recording medium is continuously fed in the sub-scanning direction, and the recording medium with the ink adhered thereto is wound downstream. The type of the recording apparatus shown in FIG. 1 is the line system.

The adhesion conditions such as the duty and the like of the first ink in the first ejection step are not particularly limited and can be properly adjusted according to an intended image.

In the method for producing a recorded matter according to the embodiment of the disclosure, preferably the first ink is a color ink, and the second ink is a clear ink. In this case, the first ink which is the color ink is adhered, and then the second ink which is the clear ink is adhered. This can improve peelability between the recording surface having the image formed thereon by the first ink and the non-recording surface, and thus can suppress marks remaining on the recording surface and adhesion of a portion of the ink layer to the non-recording surface.

The "clear ink" represents an ink not for the purpose of coloring which is a concept corresponding to the color ink used for coloring the recording medium. Specifically, the clear ink represents an ink composition preferably containing a coloring material at a content of less than 0.2% by mass, and more preferably not containing a coloring material. On the other hand, the color ink represents an ink used for coloring the recording medium and preferably containing a coloring material at a content of 0.2% by mass or more.

Further, the method for producing a recorded matter according to the present embodiment may include another ejection step and another irradiation step before the first ejection step. For example, in the other ejection step and other irradiation step, a white ink may be adhered to the recorded matter and cured, and the first ejection step may be performed on the formed white ink layer. This can form a concealment layer and thus can obtain the recorded matter having good color development when seen from the recording surface side.

In another aspect, for example, in the other ejection step and other irradiation step, a color ink may be adhered to a recorded matter and cured to form an image, and a white ink may be adhered to the resultant color ink layer in the first ejection step and cured. This can form a concealment layer or the like and can form a recorded matter having good color development when a transparent recording medium is seen from the non-recording surface.

The recording medium is preferably a nonabsorptive recording medium. In particular, both the recording surface and the non-recording surface of the recording medium used in the present embodiment are preferably nonabsorptive. The use of such a recording medium can produce a recorded matter suitable for applications such as a label and the like. In addition, the ink cured coating film is easily adhered to the non-recording surface due to non-absorptivity, and thus the irregularities formed by the second ink more effectively function, thereby causing a tendency to more improve the peelability of the recorded matter.

Examples of a nonabsorptive recording medium include, but are not particularly limited to, films and plates of plastics, such as polyvinyl chloride, polyethylene, polypropylene, polyethylene terephthalate (PET), polycarbonate, polystyrene, polyurethane, and the like; plates of metals, such as iron, silver, copper, aluminum, and the like; metal plates and plastic films produced by vapor deposition of these various metals; plates of alloys such as stainless, brass, and the like; recording media produced by bonding (coating), to a paper-made substrate, plastics, such as polyvinyl chloride, polyethylene, polypropylene, polyethylene terephthalate (PET), polycarbonate, polystyrene, polyurethane, and the like.

In the present embodiment, the "non-absorptivity" represents that in a Bristow method, the amount of water absorption from the contact start to 30 msec is 10 mL/m$^2$ or less. Also, the nonabsorptive recording medium represents a recording medium having such non-absorptivity. The Bristow method is most popularized as a method for measuring a liquid absorption amount within a short time, and is used in "Japan Technical Association of the Pulp and Paper Industry" (JAPAN TAPPI). The details of the test method are described in "Standard No. 51—Paper and Paperboard—Liquid Absorption Test Method—Bristow method" of JAPAN TAPPI PAPER AND PULP TEST METHODS, 2000.

1.2. First Irradiation Step

The first irradiation step is a step of irradiating radiation to the first ink adhered to the recording medium 6 from the light sources 4a to 4d, producing a cured coating film of the first ink. In the first irradiation step and the second irradiation step described later, radiation is irradiated to the radiation-curable ink jet composition adhered to the recording medium. The radiation irradiation starts polymerization reaction of monomers and cures the composition, thereby forming the coating film. In this case, when a polymerization initiator is present, active species (initiation species) such as radicals, acid, base, or the like is generated, and polymerization reaction of the monomers is promoted by the function of the initiation species.

Examples of radiation include ultraviolet light, infrared light, visible light, X-rays, and the like. The radiation is irradiated to the composition from a radiation source provided downstream the ink jet head. The radiation source is not particularly limited but is, for example, UV-LED. The use of such a radiation source can realize miniaturization of an apparatus and a decrease in cost. The UV-LED is small-sized and thus can be provided as an ultraviolet light source in an ink jet recording apparatus.

1.3. Second Ejection Step

The second ejection step is a step of ejecting the second ink, which is a radiation-curable ink jet composition, from the second ink jet head 3 and adhering the second ink to the cured coating film of the first ink so that the duty is within a predetermined range. The duty in the second ejection step is 1% or more and 20% or less, preferably 3% or more and 18% or less, and more preferably 6% or more and 15% or less. The duty of 1% or more can improve peelability between the recording surface and the non-recording surface, and thus can suppress marks remaining on the recording surface and adhesion of a portion of the ink layer on the non-recording surface. Also, the duty of 20% or less can more decrease the influence of irregularities on the image quality, and thus tends to more suppress a change in texture of the recorded matter produced by the first ink.

In the present embodiment, the "duty" is a value calculated by a formula below and represents the amount of ink adhered to pixels. Herein, the duty of 1% or more and 20% or less represents that the number of actual printing dots is 1 to 20% of predetermined pixels (longitudinal resolution× transverse resolution).

Duty (%)=Number of actual printing dots/(longitudinal resolution×transverse resolution)×100

In the formula, "Number of actual printing dots" is the number of actual printing dots per unit area, and each of "longitudinal resolution" and "transverse resolution" is resolution per unit area.

1.4. Second Irradiation Step

The second irradiation step is a step of irradiating radiation from the light source 4e to the second ink adhered to the recording medium 6 to cure the second ink to produce a recorded matter. Thus, the second ink adhered to the cured coating film of the first ink can be cured, and irregularities can be formed according to the duty of adhesion in the second ejection step. The radiation irradiation can be performed by the same method as in the first irradiation step.

1.5. Lamination Step

The lamination step is a step of laminating, in the recorded matter, the recording surface to which the first ink and the second ink have been adhered, and the non-recording surface to which the first ink and the second ink have not been adhered, so that both surfaces face each other.

Examples of the lamination method in the lamination step include, but are not particularly limited to, a method of laminating one by one single-sheet-shaped recorded matters so that the recording surface faces the non-recording surface, and a lamination method of winding a recorded matter, produced by continuously recording on a long-sized recording medium, into a roll shape downstream the recording apparatus so that the recording surface faces the non-recording surface. More specifically, the recorded matter can be wound by the winding roller 52, thereby forming a wound body. In the wound body, the recorded matter is wound so that the recording surface and the non-recording surface are laminated to face each other.

Winding into a roll shape as described above causes, in a roll, the recording surface to be strongly pressed on the non-recording surface, and both surfaces to be rubbed with each other during rolling. Therefore, the present disclosure is particularly useful because the disclosure can improve the peelability between the recording surface and the non-recording surface, and can suppress marks remaining on the recording surface and suppress adhesion of a portion of the ink layer to the non-recording surface.

1.6. First Ink and Second Ink

Both the first ink and the second ink used in the present embodiment are radiation-curable ink jet compositions. The first ink and the second ink are described in detail below, but when the first ink and the second ink need not be discriminated from each other, they are together simply referred to as the "ink". In particular, when the configuration of the first ink or the second ink is described, an object thereof is specified.

The ink is not particularly limited as long as it is the radiation-curable ink jet composition. In the present embodiment, the radiation-curable ink jet composition represents a composition which is cured by radiation irradiation. Examples of the radiation include ultraviolet light, electron beams, infrared light, visible light, X-rays, and the like. Among these, ultraviolet light is preferred in view of easy availability and wide use of a radiation source and in view of easy availability and wide use of a material suitable for curing by ultraviolet irradiation.

The ink is not particularly limited, but may contain, for example, a polymerizable compound, a photopolymerization initiator, a polymerization inhibitor, a slipping agent, a coloring material, a dispersant, etc. As described above, preferably, the first ink is the color ink, and the second ink is the clear ink. Each of the components is described in detail below.

1.6.1. Polymerizable Compound

The polymerizable compound contains a monofunctional monomer and, if required, may contain a polyfunctional monomer.

1.6.1.2. Monofunctional Monomer

Examples of the monofunctional monomer include, but are not particularly limited to, a monofunctional monomer having an alicyclic group, a monofunctional monomer having an aromatic group, and a monofunctional monomer having a nitrogen-containing heterering. Also, a monomer other than these monomers may be used as the monofunctional monomer.

The use of the monofunctional monomer has an advantage of improving the adhesion as described above and obtaining the recorded matter having excellent stretchability. On the other hand, when the recording surface formed by the ink having high adhesion and the non-recording surface are laminated, peelability is rather easily decreased due to the high adhesion, and marks easily remain. Therefore, the present disclosure is useful from the viewpoint of producing the recorded matter having excellent peelability and few remaining marks while producing the recorded matter utilizing the characteristics of the monofunctional monomer.

In particular, when the first ink contains the monofunctional monomer, the content of the monofunctional monomer relative to the total amount of the polymerizable compound in the first ink is preferably 80% by mass or more, more preferably 85% to 99% by mass, and still more preferably 90% to 98% by mass. When the content of the monofunctional monomer is 80% by mass or more, there is a tendency to more improve the adhesion between the ink layer and the recording medium and curability.

Also, when the second ink contains the monofunctional monomer, the content of the monofunctional monomer relative to the total amount of the polymerizable compound in the second ink is preferably 80% by mass or more, more preferably 85% to 99% by mass, and still more preferably 90% to 98% by mass. When the content of the monofunctional monomer is 80% by mass or more, there is a tendency to more improve the adhesion between the coating film of the first ink and the coating film of the second ink and curability. Also, the coating film of the second ink is made flexible, and thus damage to the recorded matter can be easily prevented when the laminated recorded matter is processed and then used.

1.6.1.2.1. Monofunctional Monomer Having Alicyclic Group

Examples of the monofunctional monomer having an alicyclic group include, but are not particularly limited to, alicyclic group-containing (meth)acrylates such as dicyclopentenyl (meth)acrylate, dicyclopentenyloxyethyl (meth)acrylate, dicyclopentanyl (meth)acrylate, 3,3,5-trimethylcyclohexyl (meth)acrylate, isobornyl (meth)acrylate, tert-butylcyclohexanol (meth)acrylate, 1,4-dioxaspiro[4,5]dec-2-ylmethyl 2-(meth)acrylate, and the like.

Among these, dicyclopentenyl (meth)acrylate (DCPA) and isobornyl (meth)acrylate (IBXA) are preferred. The coating film formed by using such a monomer tends to have more improved adhesion and abrasion resistance.

The content of the monofunctional monomer having an alicyclic group relative to the total amount of the polymerizable compound is preferably 25% to 55% by mass, more preferably 30% to 50% by mass, and still more preferably 35% to 45% by mass. When the content of the monofunctional monomer having an alicyclic group is within the range described above, there is a tendency to more improve adhesion and abrasion resistance of the resultant coating film.

1.6.1.2.2. Monofunctional Monomer Having Aromatic Group

Examples of the monofunctional monomer having an aromatic group include, but are not particularly limited to, phenoxyethyl (meth)acrylate, benzyl (meth)acrylate, alkoxylated 2-phenoxyethyl(meth)acrylate, ethoxylated nonylphenyl (meth)acrylate, alkoxylated nonylphenyl (meth)acrylate, p-cumylphenol EO-modified (meth)acrylate, and 2-hydroxy-3-phenoxypropyl (meth)acrylate.

Among these, phenoxyethyl acrylate (PEA) is preferred. The use of such an aromatic group-containing monofunctional monomer tends to more improve solubility of the photopolymerization initiator and more improve durability of the ink. In particular, when an acylphosphine oxide-based photopolymerization initiator or thioxanthone-based photopolymerization initiator is used, the solubility thereof tends to be more improved.

The content of the monofunctional monomer having an aromatic group relative to the total amount of the polymerizable compound is preferably 20% to 50% by mass, more preferably 25% to 45% by mass, and still more preferably 28% to 40% by mass. When the content of the aromatic group-containing monofunctional monomer is within the range described above, there is a tendency to more improve adhesion and abrasion resistance of the resultant coating film.

1.6.1.2.3. Nitrogen-Containing Monofunctional Monomer

Examples of the nitrogen-containing monofunctional monomer include, but are not particularly limited to, nitrogen-containing monofunctional vinyl monomers such as N-vinylcaprolactam, N-vinylformamide, N-vinylcarbazole, N-vinylacetamide, N-vinylpyrrolidone and the like; nitrogen-containing monofunctional acrylate monomers such as acryloyl morpholine and the like; and nitrogen-containing monofunctional acrylamide monomers such as (meth)acrylamide, (meth)acrylamides such as N-hydroxymethyl (meth)acrylamide, diacetone acrylamide, N,N-dimethyl (meth)acrylamide, dimethylaminoethyl acrylate benzyl chloride quaternary salt, and the like.

Among these, a monomer having a nitrogen-containing heterocyclic structure, such as N-vinylcaprolactam, N-vinylcarbazole, N-vinylpyrrolidone, or acryloyl morpholine is more preferred, and acryloyl morpholine (ACMO) is more preferably contained. The use of such a nitrogen-containing monofunctional monomer tends to more improve the abrasion resistance of the coating film. Further, the nitrogen-containing monofunctional acrylate monomer having a nitrogen-containing heterocyclic structure, such as acryloyl morpholine or the like, tends to more improve stretchability and adhesion of the coating film.

The content of the nitrogen-containing monofunctional monomer relative to the total amount of the polymerizable compound is preferably 10% to 25% by mass, more preferably 12.5% to 22.5% by mass, and still more preferably 15% to 20% by mass. When the content of the nitrogen-containing monofunctional monomer is within the range described above, there is a tendency to more improve abrasion resistance and adhesion of the resultant coating film.

1.6.1.3. Polyfunctional Monomer

Examples of the polyfunctional monomer include, but are not particularly limited to, vinyl group-containing (meth)acrylate and polyfunctional (meth)acrylate.

1.6.1.3.1. Vinyl Group-Containing (meth)acrylate

Examples of the vinyl group-containing (meth)acrylate include, but are not particularly limited to, compounds represented by formula (1).

$$H_2C=CR^1-CO-OR^2-O-CH=CH-R^3 \quad (1)$$

In the formula, $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

In the formula (1), examples of a divalent organic residue having 2 to 20 carbon atoms represented by $R^2$ include a straight-chain, branched, or cyclic alkylene group having 2 to 20 carbon atoms, which may be substituted; an alkylene group having 2 to 20 carbon atoms and an ether bond and/or ester bond oxygen atom in the structure, which may be substituted; and a divalent aromatic group having 6 to 11 carbon atoms, which may be substituted.

Among these, preferred are alkylene groups having 2 to 6 carbon atoms, such as an ethylene group, a n-propylene group, an isopropylene group, and a butylene group; alkylene groups having 2 to 9 carbon atoms and an ether bond oxygen atom in the structure, such as an oxyethylene group, an oxy-n-propylene group, an oxyisopropylene group, and an oxybutylene group. Further, from the viewpoint of enabling a decrease in viscosity of the composition and more improving the curability of the composition, more preferred is a compound having a glycol ether chain in which $R^2$ is an alkylene group having 2 to 9 carbon atoms and an ether bond oxygen atom in the structure, such as an oxyethylene group, an oxy-n-propylene group, an oxyisopropylene group, or an oxybutylene group.

In the formula (1), a monovalent organic residue having 1 to 11 carbon atoms and represented by $R^3$ is preferably a straight-chain, branched, or cyclic alkyl group having 1 to 10 carbon atoms, which may be substituted, or an aromatic group having 6 to 11 carbon atoms, which may be substituted.

Among these, preferably used are alkyl groups having 1 to 2 carbon atoms, such as a methyl group and an ethyl group, aromatic groups having 6 to 8 carbon atoms, such as a phenyl group, a benzyl group, and the like.

A typical example of compounds of the formula (1) is not particularly limited but is, for example, 2-(2-vinyloxyethoxy)ethyl (meth)acrylate, and 2-(2-vinyloxyethoxy)ethyl acrylate (VEEA) is preferred.

In particular, the second ink preferably contains, as the polyfunctional monomer, a vinyl group-containing (meth)acrylate represented by the formula (1). This tends to more improve the curability of the second ink.

The content of the vinyl group-containing (meth)acrylate relative to the total amount of the polymerizable compound is preferably 1% to 25% by mass, more preferably 2% to 20% by mass, and still more preferably 3% to 15% by mass. When the content of the nitrogen-containing monofunctional monomer is within the range described above, there is a tendency to decrease the viscosity of the ink and more improve ejection stability.

1.6.1.3.2. Polyfunctional (meth)acrylate

Examples of the polyfunctional (meth)acrylate include, but are not particularly limited to, difunctional (meth)acrylates such as dipropylene glycol di(meth)acrylate, diethylene glycol di(meth)acrylate, triethylene glycol di(meth)acrylate, and the like; and trifunctional or higher polyfunctional (meth)acrylates such as trimethylolpropane tri(meth)acrylate, EO-modified trimethylolpropane tri(meth)acrylate, pentaerythritol tri(meth)acrylate, pentaerythritol tetra(meth)acrylate, and the like.

Among these, dipropylene glycol diacrylate (DPGDA) is preferred. The use of such a polyfunctional (meth)acrylate tends to more improve the curability and abrasion resistance of the ink.

The content of the polyfunctional (meth)acrylate relative to the total amount of the polymerizable compound is preferably 1.0% to 10% by mass, more preferably 2.0% to 8.0% by mass, and still more preferably 3.0% to 7.0% by mass. When the content of the polyfunctional (meth)acrylate is within the range described above, there is a tendency to more improve curability and abrasion resistance of the ink.

1.6.2. Photopolymerization Initiator

The photopolymerization initiator is not particularly limited as long as active species is produced by radiation irradiation, and examples thereof include known photopolymerization initiators such as an acylphosphine oxide-based photopolymerization initiator, an alkylphenone-based polymerization initiator, a titanocene-based polymerization initiator, a thioxanthone-based photopolymerization initiator, and the like. Among these, an acylphosphine oxide-based photopolymerization initiator is preferred. The use of such a photopolymerization initiator tends to more improve the curability of the ink, and particularly more improve the curability by a curing process using UV-LED light. These photopolymerization initiators may be used alone or in combination of two or more.

Examples of the acylphosphine oxide-based photopolymerization initiator include, but are not particularly limited to, 2,4,6-trimethylbenzoyl diphenylphosphine oxide. bis(2,4,6-trimethylbenzoyl)-phenylphosphine oxide, bis-(2,6-dimethoxybenzoyl)-2,4,4-trimethylpentylphosphine oxide, and the like.

Examples of a commercial product of the acylphosphine oxide-based photopolymerization initiator include IRGACURE 819 (bis(2,4,6-trimethylbenzoyl)-phenylphosphine oxide), IRGACURE 1800 (mixture of bis-(2,6-dimethoxybenzoyl)-2,4,4-trimethylpentylphosphine oxide and 1-hydroxy-cyclohexyl-phenyl ketone at a mass ratio of 25:75), and IRGACURE TPO (2,4,6-trimethylbenzoyl diphenylphosphine oxide) (above all manufactured by BASF Corporation), and the like.

The content of the photopolymerization initiator relative to the total amount of the ink is preferably 3.0% to 15% by mass, more preferably 5.0% to 13.5% by mass, and still more preferably 8.0% to 12% by mass. When the content of the photopolymerization initiator is within the range described above, there is a tendency to more improve curability of the ink and solubility of the photopolymerization initiator.

1.6.3. Polymerization Inhibitor

Examples of the polymerization inhibitor include, but are not particularly limited to, p-methoxyphenol, hydroquinone monomethyl ether (MEHQ), 4-hydroxy-2,2,6,6-tetramethylpiperidine-N-oxyl, hydroquinone, cresol, tert-butylcatechol, 3,5-di-tert-butyl-4-hydroxytoluene, 2,2'-methylenebis(4-methyl-6-tert-butylphenol), 2,2'-methylenebis(4-ethyl-6-butylphenol), 4,4'-thiobis(3-methyl-6-tert-butylphenol), a hindered amine compound, and the like. The polymerization inhibitors may be used alone or in combination of two or more.

The content of the polymerization inhibitor relative to the total amount of the ink is preferably 0.05% to 1.0% by mass and more preferably 0.05% to 0.5% by mass.

1.6.4. Slipping Agent

The slipping agent is preferably a silicone-based surfactant and more preferably polyester-modified silicone or polyether-modified silicone. Examples of the polyester-modified silicone include BYK-347, 348, BYK-UV3500, 3510, and 3530 (the above manufactured by BYK Additives & Instruments Ltd.) and the like, and examples of polyether-modified silicone include BYK-3570 (manufactured by BYK Additives & Instruments Ltd.) and the like. The slipping agents may be used alone or in combination of two or more.

The content of the slipping agent relative to the total amount of the ink is preferably 0.01% to 2.0% by mass and more preferably 0.05% to 1.0% by mass.

1.6.5. Coloring Agent

At least one of a pigment and a dye can be used as the coloring material.

The total content of the coloring material in the color ink relative to the total amount of the ink is preferably 0.2% to 20% by mass, more preferably 0.5% to 15% by mass, and still more preferably 1.0% to 10% by mass. As described above, the clear ink preferably does not contain the coloring material, and even if inevitably contains the coloring material, the content is less than 0.2% by mass.

1.6.6. Dispersant

The dispersant is not particularly limited but is, for example, a dispersant, such as a polymer dispersant, commonly used for preparing a pigment dispersion liquid. A specific example thereof contains as a main component one or more of polyoxyalkylene polyalkylene polyamine, vinyl-based polymer and copolymer, acrylic polymer and copolymer, polyester, polyamide, polyimide, polyurethane, an amino-based polymer, a silicon-containing polymer, a sulfur-containing polymer, a fluorine-containing polymer, and an epoxy resin. The dispersants may be used alone or in combination of two or more.

Examples of a commercial product of the polymer dispersant include Ajisper Series manufactured by Ajinomoto Fine-Techno Co., Inc., Solsperse Series (Solsperse 36000 and the like) available from Avecia Inc. and Noveon Inc., Disper BYK Series manufactured by BYK Additives & Instruments Ltd., and Disparlon Series manufactured by Kusumoto Chemicals, Ltd.

The content of the dispersant relative to the total amount of the ink is preferably 0.1% to 2.0% by mass, more preferably 0.1% to 1.0% by mass, and still more preferably 0.1% to 0.5% by mass.

2. Recorded Matter

Figure 2:
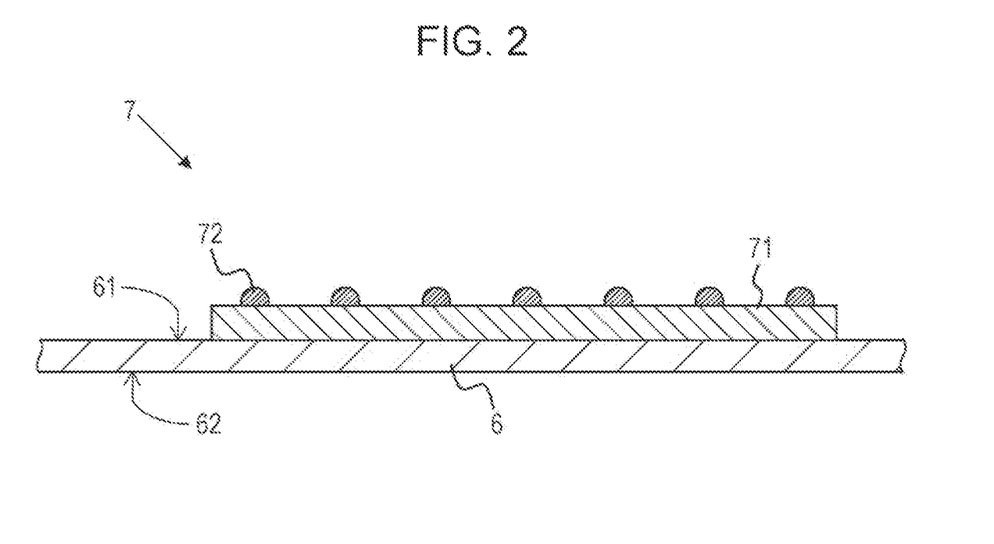
FIG. 2 is a schematic sectional view of a recorded matter according to an embodiment of the present disclosure.

FIG. 2 is a schematic sectional view of a recorded matter 7 according to the present embodiment. As shown in FIG. 2, the recorded matter 7 according to the present embodiment includes a recording medium 6 having a recording surface 61 to which a first ink 71 and a second ink 72 are adhered, and a non-recording surface 62 to which the first ink 71 and the second ink 72 are not adhered. The first ink 71 is adhered to the recording surface 61 of the recording medium 6, and the second ink 72 is adhered to the first ink 71 with a relatively low duty.

For example, the first ink 71 which is a color ink is adhered as a solid image, and then the second ink 72 which is a clear ink is adhered with a low duty, thereby improving peelability between the recording surface 61 having the image formed with the first ink 71 and the non-recording surface 62. Thus, marks remaining on the recording surface 61 can be suppressed, and adhesion of a portion of the first ink 71 or the second ink 72 to the non-recording surface 62 can be suppressed.

The recording medium 6 used in the recorded matter 7 according to the present embodiment is long-sized as shown in FIG. 1, and the recorded matter 7 is preferably stored as a wound body formed by winding on a roller. The storage in this state causes contact between the recording surface 61 and the non-recording surface 62 in the recorded matter 7, but the second ink 72 decreases the contact area between the recording surface 61 and the non-recording surface 62. Thus, even when the recorded matter 7 is unwound from the wound body and used for a label or the like, marks remaining on the recording surface 61 and adhesion of a portion of the first ink 71 or the second ink 72 to the non-recording surface 62 can be suppressed.

In particular, when a large amount of the monofunctional monomer is used for the first ink 71 from the viewpoint of improvement in the adhesion of the image layer formed by the first ink 71 to the recording medium 6 and improvement in followability thereof, the adhesion between the recording surface 61 and the non-recording surface 62 is also improved, thereby easily causing a problem of remaining marks and peeling. However, in the recorded matter 7 according to the present embodiment, the adhesion between the recording surface 61 and the non-recording surface 62 can be decreased by the second ink 72, and thus remaining marks and peeling can be suppressed.

EXAMPLES

The present disclosure is described in further detail below by using examples and comparative examples. The present disclosure is not limited to these examples below.

1. Preparation of Ink Jet Composition

First, a coloring material, a dispersant, and some of the monomers were weighed and placed in a tank for pigment dispersion, and then stirred by the ceramic beads mill having a diameter of 1 mm planed in the tank, preparing a pigment dispersion liquid containing the coloring material dispersed in the monomers.

Next, the remaining monomers, a polymerization initiator, and a polymerization inhibitor were placed in a tank for mixture, which was a stainless container, so as to provide each of the compositions shown in Table 1, and completely dissolved by mixing and stirring. Then, the pigment dispersion liquid prepared as described above was poured into the resultant solution, further mixed and stirred at room temperature for 1 hour, and further filtered with a membrane filter of 5 μm, preparing a radiation-curable ink jet composition of each of the examples. The numerical value of each of the components shown in each of the examples in the table represents "% by mass" unless otherwise specified.

TABLE 1

|  |  |  | Color ink | | | | | Clear ink | | White ink |
|---|---|---|---|---|---|---|---|---|---|---|
|  |  |  | 1 | 2 | 3 | 4 | 5 | 6 | 7 | 8 |
| Polymerizable compound | Monofunctional monomer | PEA | 26.0 | 22.0 | 31.0 | 19.0 | 20.0 | 33.2 | 33.2 | 26.0 |
|  |  | ACMO | 15.0 | 15.0 | 15.0 | 15.0 | 10.0 | 15.0 | 15.0 | 10.0 |
|  |  | DCPA | 10.0 | 10.0 | 10.0 | 10.0 | 5.0 | 10.0 | 10.0 | 6.0 |
|  |  | IBXA | 25.0 | 25.0 | 25.0 | 25.0 | 19.0 | 25.0 | 25.0 | 20.0 |
|  | Polyfunctional monomer | VEEA | 8.0 | 12.0 | 3.0 | 15.0 | 30.0 | 5.0 | — | 8.0 |
|  |  | DPGDA | — | — | — | — | — | — | 5.0 | — |
| Photopolymerization initiator |  | 819 | 5.5 | 5.5 | 5.5 | 5.5 | 5.5 | 5.5 | 5.5 | 5.5 |
|  |  | TPO | 5.5 | 5.5 | 5.5 | 5.5 | 5.5 | 5.5 | 5.5 | 5.5 |
| Polymerization inhibitor | MEHQ |  | 0.3 | 0.3 | 0.3 | 0.3 | 0.3 | 0.3 | 0.3 | 0.3 |
| Slipping agent | BYK UV3500 |  | 0.5 | 0.5 | 0.5 | 0.5 | 0.5 | 0.5 | 0.5 | 0.5 |
| Coloring material | PB15:3 |  | 4.0 | 4.0 | 4.0 | 4.0 | 4.0 | — | — | — |
|  | PW6 |  | — | — | — | — | — | — | — | 18.0 |
| Dispersant | solsperse36000 |  | 0.2 | 0.2 | 0.2 | 0.2 | 0.2 | — | — | 0.2 |
| Total |  |  | 100.0 | 100.0 | 100.0 | 100.0 | 100.0 | 100.0 | 100.0 | 100.0 |
| Content of monofunctional monomer relative to total amount of polymerizable compound |  |  | 90.5 | 85.7 | 96.4 | 82.1 | 64.3 | 94.3 | 94.3 | 88.6 |
| Evaluation | Adhesion |  | A | A | A | B | C | A | A | A |
|  | Curability |  | B | B | A | A | A | B | C | B |

Monofunctional monomer
ACMO (manufactured by KJ Chemicals Corporation, acryloyl morpholine)
PEA (trade name "Viscoat #192", manufactured by Osaka Organic Chemical Industry, Ltd., phenoxyethyl acrylate)
DCPA (manufactured by Hitachi Chemical Co., Ltd., dicyclopentenyl acrylate)
IBXA (manufactured by Osaka Organic Chemical Industry, Ltd., isobornyl acrylate)
Polyfunctional monomer
VEEA (manufactured by Nippon Shokubai Co., Ltd., 2-(2-vinyloxyethoxy)ethyl acrylate)
DPGDA (trade name "SR508", manufactured by Sartomer Inc., dipropylene glycol diacrylate) Polymerization initiator
819 (trade name "IRGACURE 819" manufactured by BASF Corporation, bis (2,4,6-trimethylbenzoyl)-phenylphosphine oxide)
TPO (trade name "IRGACURE TPO", manufactured by BASF Corporation, 2,4,6-trimethylbenzoyl diphenylphosphine oxide)
Polymerization inhibitor
MEHQ (trade name "p-methoxyphenol", manufactured by Kanto Chemical Co., Ltd., hydroquinone monomethyl ether) Slipping agent
BYK-UV3500 (manufactured by BYK Additives & Instruments Ltd., polyether-modified polydimethylsiloxane having an acryloyl group) Coloring material (pigment)
PB15:3 (trade name "C. I. Pigment Blue 15:3", manufactured by DIC Corporation, phthalocyanine blue)
PW6 (trade name "C. I. Pigment White 6" manufactured by Tayca Corporation, titanium oxide) Dispersant
Solsperse 36000 (manufactured by Lubrizol Corporation, polymer dispersant)

In Table 1, "Content of monofunctional monomer relative to total amount of polymerizable compound" represents the ratio (% by mass) of the content of monofunctional monomer relative to the total amount of the polymerizable compounds.

2. Evaluation Method 2.1. Adhesion

Each of the radiation-curable ink jet compositions described in Table 1 was ejected on a vinyl chloride film (JT5829R, manufactured by MACtac Inc.) at 20 ng/dot and 600 dpi×600 dpi by using a printer provided with LED (product No. PX-G5000 modified machine, manufactured by Seiko Epson Corporation) and then cured to form a coating film having a thickness of 10 μm. A notch was made in the resultant coating film, and a transparent adhesive tape was attached to a notch portion and then sufficiently rubbed with the finger so that the coating film was seen through. Next, the tape was peeled from the coating film over 0.5 to 1.0 seconds at an angle close to 60° within 5 minutes from the adhesion of the tape. In this case, the adhesion was evaluated based on the presence of peeling of the coating film from the vinyl chloride film according to the following criteria.

Evaluation Criteria
A: Peeling was not observed.
B: Partial peeling was observed.
C: Entire peeling was observed.

2.2. Curability

Each of the radiation-curable ink jet compositions described in Table 1 was coated so that the coating thickness was 10 μm on a vinyl chloride film (JT5829R, manufactured by MACtac Inc.) by using a printer provided with LED (product No. PX-G5000 modified machine, manufactured by Seiko Epson Corporation). Then, the ink jet composition was irradiated with ultraviolet light with a center wavelength of 395 nm and 1000 mW/cm$^2$ for a predetermined time. Then, the coating film was rubbed with a cotton swab, and curability was evaluated based on the irradiation energy with which the cotton swab was not colored. The irradiation energy [mJ/cm$^2$] was determined from the product of irradiation intensity [mW/cm$^2$] and the irradiation duration time [s]. The evaluation criteria are as follows.

Evaluation Criteria
A: Irradiation energy was 200 mJ/cm$^2$ or less.
B: Irradiation energy was over 200 mJ/cm$^2$ and 300 mJ/cm$^2$ less.
C: Irradiation energy was over 300 mJ/cm$^2$.

2.3. Remaining Marks

Each of the radiation-curable ink jet compositions in each of the combinations described in Table 2 was adhered to a vinyl chloride film (JT5829R, manufactured by MACtac Inc.) by using a printer provided with LED (product No. PX-G5000 modified machine, manufactured by Seiko Epson Corporation). In this case, the first ink for a lower layer was adhered to form a solid image at 20 ng/dot, 600 dpi×600 dpi, and a duty of 100%, and after adhesion of the first ink, a coating film was formed by irradiation with ultraviolet light so that the irradiation energy was 400 mJ/cm². Also, the second ink for an upper layer was adhered to be superposed on the coating film of the first ink under the adhesion conditions of 20 ng/dot, 600 dpi×600 dpi, and the condition of a duty shown in Table 2. With respect to the second ink, after the adhesion of the second ink, a recorded matter was formed by irradiation with ultraviolet light so that the irradiation energy was 400 mJ/cm². Only in Comparative Example 1, the second ink for the upper layer was not adhered, and evaluation was made as described below.

Another vinyl chloride film not recorded was superposed on the recording surface, to which the first ink and the second ink had been adhered, in the recorded matter obtained as described above, and a load of 1 Kg was applied from above to the film and allowed to stand for 10 minutes. Then, the other vinyl chloride film was separated from the recorded matter, and whether or not marks of the vinyl chloride film were transferred to the recording surface was visually confirmed. The evaluation criteria are as follows.

Evaluation Criteria
- A: No transfer marks was present on the recording surface.
- B: Slight transfer marks were present on the recording surface.
- C: Noticeable transfer marks were present on the recording surface.
- D: Noticeable transfer marks were present on the recording surface, and color transfer was present on the back surface of the other vinyl chloride film.

2.4. Gloss Feeling

A recorded matter was obtained by the same method as for the remaining marks. The distance from the coating film was visually determined at the time when reflection of a fluorescent lamp from the resultant recorded matter could be visually confirmed. The evaluation criteria are as follows.

Evaluation Criteria
- A: The reflection could be confirmed even at a distance of 50 cm or more.
- B: The reflection could be confirmed at a distance of 30 cm or more and less than 50 cm.
- C: The reflection could be confirmed at a distance of less than 30 cm.

3. Evaluation Results

Table 2 shows the conditions of the recording method using each of the radiation-curable ink jet compositions and the evaluation results. Table 2 indicates that when the second ink is coated with a predetermined duty, remaining marks are decreased, and the image quality (glass feeling) of the first ink is maintained.

What is claimed is:

1. A method for producing a recorded matter comprising:
   a first ejection step of ejecting a first ink, which is a radiation-curable ink jet composition, and adhering the first ink to a recording medium;
   a first irradiation step of irradiating radiation to the first ink adhered to the recording medium to obtain a cured coating film of the first ink;
   a second ejection step of ejecting a second ink, which is a radiation-curable ink jet composition, and adhering the second ink to the cured coating film of the first ink so that a duty is 1% or more and 20% or less, wherein the duty (%) is equal to a number of actual printing dots/(longitudinal resolution×transverse resolution)×100;
   a second irradiation step of irradiating radiation to the second ink adhered to the recording medium to cure the second ink to obtain a recorded matter; and
   a lamination step of laminating, in the recorded matter, a recording surface to which the first ink and the second ink have been adhered, and a non-recording surface to which the first ink and the second ink have not been adhered, so that both surfaces face each other,
   wherein in the lamination step, the recorded matter is wound in a roll shape so that the recording surface and the non-recording surface are laminated to face each other.

2. The method for producing a recorded matter according to claim 1, wherein the first ink is a color ink.

3. The method for producing a recorded matter according to claim 1, wherein the second ink is a clear ink.

4. The method for producing a recorded matter according to claim 1, wherein both the recording surface and the non-recording surface are nonabsorptive.

5. The method for producing a recorded matter according to claim 1,
   wherein the first ink contains a polymerizable compound containing a monofunctional monomer; and
   the content of the monofunctional monomer is 80% by mass or more relative to the total amount of the polymerizable compound.

TABLE 2

| | | Example | | | | | | | | | | | | | | | Comparative Example | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 1 | 2 | 3 |
| Recording condition | First ink (lower layer) | 1 | 1 | 1 | 2 | 2 | 2 | 3 | 3 | 3 | 1 | 1 | 1 | 8 | 4 | 5 | 1 | 1 | 1 |
| | Second ink (upper layer) | 6 | 6 | 6 | 6 | 6 | 6 | 6 | 6 | 6 | 7 | 7 | 7 | 1 | 6 | 6 | — | 6 | 6 |
| | Printing duty of second ink | 20 | 15 | 5 | 20 | 15 | 5 | 20 | 15 | 5 | 20 | 15 | 5 | 15 | 15 | 15 | — | 30 | 100 |
| Evaluation | Remaining marks | A | A | B | A | A | B | A | B | B | A | A | B | A | A | A | D | C | D |
| | Gloss feeling | B | A | A | B | A | A | B | A | A | B | A | A | B | A | A | A | C | A |

6. The method for producing a recorded matter according to claim 1,
wherein the second ink contains a polymerizable compound containing a polyfunctional monomer; and
the polyfunctional monomer contains a vinyl group-containing (meth)acrylate represented by formula (1) below $$H_2C=CR^1-CO-OR^2-O-CH=CH-R^3 \qquad (1),$$

in the formula, $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

7. The method for producing a recorded matter according to claim 1,
wherein the polymerizable compound contained in the second ink contains a monofunctional monomer; and
the content of the monofunctional monomer is 80% by mass or more relative to the total amount of the polymerizable compound.

8. The method for producing a recorded matter according to claim 1, wherein an irradiation energy in each of the first and second irradiation steps is 200 mJ/cm² or less.

* * * * *